US008433680B2

(12) United States Patent
Ling et al.

(10) Patent No.: US 8,433,680 B2
(45) Date of Patent: Apr. 30, 2013

(54) CAPTURING AND RESTORING DATABASE SESSION STATE

(75) Inventors: Chao Ling, Fremont, CA (US); Feng Cao, Belmont, CA (US); Rajendra Pingte, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 878 days.

(21) Appl. No.: 12/166,272

(22) Filed: Jul. 1, 2008

(65) Prior Publication Data

US 2010/0005097 A1    Jan. 7, 2010

(51) Int. Cl.
*G06F 7/00* (2006.01)
*G06F 17/00* (2006.01)

(52) U.S. Cl.
USPC .......................................... 707/615; 707/649

(58) Field of Classification Search ............ 707/649, 707/615
See application file for complete search history.

(56) References Cited

U.S. PATENT DOCUMENTS

| | | | | |
|---|---|---|---|---|
| 5,440,735 A | * | 8/1995 | Goldring | 1/1 |
| 5,774,668 A | | 6/1998 | Choquier et al. | |
| 5,918,059 A | | 6/1999 | Tavallaei et al. | |
| 5,951,694 A | | 9/1999 | Choquier et al. | |
| 6,041,344 A | * | 3/2000 | Bodamer et al. | 709/203 |
| 6,041,357 A | | 3/2000 | Kunzelman et al. | |
| 6,105,067 A | | 8/2000 | Batra | |
| 6,145,121 A | | 11/2000 | Levy et al. | |
| 6,182,139 B1 | | 1/2001 | Brendel | |
| 6,236,997 B1 | * | 5/2001 | Bodamer et al. | 1/1 |
| 6,253,228 B1 | * | 6/2001 | Ferris et al. | 709/203 |
| 6,347,313 B1 | | 2/2002 | Ma et al. | |
| 6,505,200 B1 | | 1/2003 | Ims et al. | |
| 6,587,866 B1 | | 7/2003 | Modi et al. | |

(Continued)

FOREIGN PATENT DOCUMENTS

| | | |
|---|---|---|
| EP | 1 610 238 A2 | 12/2005 |
| WO | WO 02/097664 A1 | 12/2002 |
| WO | WO 03/005202 A1 | 1/2003 |
| WO | WO 03/009139 A1 | 1/2003 |

OTHER PUBLICATIONS

Dias, K., et al., "Automatic Performance Diagnosis and Tuning in Oracle", XP-002470748, CIDR Conference, 2005, 12 pages.

(Continued)

*Primary Examiner* — Shahid Alam
*Assistant Examiner* — Joshua Bullock
(74) *Attorney, Agent, or Firm* — Hickman Palermo Truong Becker Bingham Wong LLP

(57) ABSTRACT

Techniques are described herein for capturing and restoring database session state. Production database server components save the session state of each of a plurality of database sessions. The components store workload units that are processed in these sessions. The components store updated session states in response to certain events. Thus, the components may capture multiple session states, pertaining to various different points in time, for each session. The captured session states and the captured workload are moved to a test database server. A user selects, from among the time points represented by the session states, a point in time at which the user would like workload replay to begin. Sessions are re-created on the test database server. Session states of these sessions are set to reflect the session states as they existed at the user-selected time point. Workload units are replayed in the sessions relative to the test database server.

6 Claims, 5 Drawing Sheets

U.S. PATENT DOCUMENTS

| | | | |
|---|---|---|---|
| 6,601,101 B1 | 7/2003 | Lee et al. | |
| 6,604,110 B1 | 8/2003 | Savage et al. | |
| 6,629,313 B1 * | 9/2003 | Rowe et al. | 717/136 |
| 6,667,751 B1 | 12/2003 | Wynn et al. | |
| 6,769,054 B1 * | 7/2004 | Sahin et al. | 711/162 |
| 6,775,826 B1 * | 8/2004 | Zahavi et al. | 717/128 |
| 6,813,731 B2 * | 11/2004 | Zahavi et al. | 714/45 |
| 6,925,477 B1 | 8/2005 | Champagne et al. | |
| 7,024,394 B1 | 4/2006 | Ashour et al. | |
| 7,076,480 B2 * | 7/2006 | Scardo et al. | 1/1 |
| 7,107,294 B2 | 9/2006 | Romanufa et al. | |
| 7,174,379 B2 | 2/2007 | Agarwal et al. | |
| 7,178,050 B2 | 2/2007 | Fung et al. | |
| 7,181,492 B2 | 2/2007 | Wen et al. | |
| 7,269,157 B2 | 9/2007 | Klinker et al. | |
| 7,277,945 B1 | 10/2007 | Shah et al. | |
| 7,552,171 B2 | 6/2009 | Chidambaran et al. | |
| 2003/0007497 A1 | 1/2003 | March et al. | |
| 2003/0063122 A1 | 4/2003 | Cichowlas et al. | |
| 2003/0108052 A1 | 6/2003 | Inoue et al. | |
| 2003/0172091 A1 * | 9/2003 | Norcott | 707/203 |
| 2003/0217159 A1 | 11/2003 | Schramm-Apple et al. | |
| 2004/0003041 A1 | 1/2004 | Moore et al. | |
| 2004/0015600 A1 * | 1/2004 | Tiwary et al. | 709/234 |
| 2004/0078602 A1 | 4/2004 | Rothbarth et al. | |
| 2004/0221115 A1 * | 11/2004 | Sahin et al. | 711/154 |
| 2005/0021771 A1 | 1/2005 | Kaehn et al. | |
| 2005/0038828 A1 | 2/2005 | Kaluskar et al. | |
| 2005/0038834 A1 | 2/2005 | Souder et al. | |
| 2005/0038848 A1 | 2/2005 | Kaluskar et al. | |
| 2005/0038849 A1 * | 2/2005 | Kaluskar et al. | 709/203 |
| 2005/0055383 A1 * | 3/2005 | Dias et al. | 707/202 |
| 2005/0055446 A1 | 3/2005 | Chidambaran et al. | |
| 2005/0066037 A1 | 3/2005 | Song et al. | |
| 2005/0131879 A1 * | 6/2005 | Ghosh et al. | 707/3 |
| 2005/0131881 A1 * | 6/2005 | Ghosh et al. | 707/3 |
| 2005/0132222 A1 | 6/2005 | Petrovic | |
| 2005/0239476 A1 | 10/2005 | Betrabet et al. | |
| 2005/0267965 A1 | 12/2005 | Heller | |
| 2006/0036617 A1 | 2/2006 | Bastawala et al. | |
| 2006/0184535 A1 | 8/2006 | Kaluskar et al. | |
| 2006/0200454 A1 | 9/2006 | Kaluskar et al. | |
| 2007/0226323 A1 | 9/2007 | Halpern | |
| 2008/0097960 A1 | 4/2008 | Dias et al. | |
| 2008/0097961 A1 | 4/2008 | Dias et al. | |
| 2008/0097995 A1 | 4/2008 | Dias et al. | |
| 2008/0097996 A1 | 4/2008 | Dias et al. | |
| 2008/0098003 A1 | 4/2008 | Dias et al. | |
| 2009/0100180 A1 | 4/2009 | Chidambaran et al. | |

OTHER PUBLICATIONS

European Patent Office, "International Search Report", PCT/US2007/081966, dated Mar. 11, 2008, 14 pages.

Claims, PCT/US2007/081966, 6 pages.

1996 definition of "server" available at: http://web.archive.org/web/20010411032957/http://www.webopedia.com/TERM/s/server.html, 3 pages.

2003 definition of "client" available at: http://www.techweb.com/encyclopedia/printView?term=client&view=print, 5 pages.

* cited by examiner

CAPTURING AND RESTORING DATABASE SESSION STATE

RELATED APPLICATIONS

The present application is related to the following U.S. patent applications, the contents of each of which are incorporated by reference herein: U.S. patent application Ser. No. 11/800,122, filed on May 3, 2007 and titled "DATABASE WORKLOAD CAPTURE AND REPLAY ARCHITECTURE;" U.S. patent application Ser. No. 11/800,240, filed on May 3, 2007 and titled "DATABASE WORKLOAD REPLAY REMAPPING INFRASTRUCTURE;" U.S. patent application Ser. No. 11/800,238, filed on May 3, 2007 and titled "TRANSACTIONALLY CONSISTENT DATABASE WORKLOAD REPLAY;" U.S. patent application Ser. No. 11/800,224, filed on May 3, 2007 and titled "CLIENT-DRIVEN FUNCTIONALLY EQUIVALENT DATABASE REPLAY;" U.S. patent application Ser. No. 11/800,239, filed on May 3, 2007 and titled "CAPTURING DATABASE WORKLOAD WHILE PRESERVING ORIGINAL TRANSACTIONAL AND CONCURRENCY CHARACTERISTICS FOR REPLAY;" and U.S. Provisional Patent Application Ser. No. 60/853,271, filed on Oct. 20, 2006 and titled "DATABASE WORKLOAD CAPTURE AND REPLAY ARCHITECTURE."

FIELD OF THE INVENTION

This relates generally to database management systems and, more specifically, to techniques for capturing and restoring database session state.

BACKGROUND

In a database management system (DBMS), data is stored in one or more data containers. Each container contains records. The data within each record is organized into one or more fields. In relational database management systems, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Database management systems retrieve information in response to receiving queries that specify the information to retrieve. In order for a database management system to understand the query, the query should conform to a database language recognized by the database management system, such as the Structured Query Language (SQL).

A transaction is a logical unit of work that is atomic and comprised of one or more database language statements. In a database server, an area of system memory is allocated and one or more processes are started to execute one or more transactions. The database server communicates with connected user processes and performs tasks on behalf of the user. These tasks typically include the execution of transactions. The combination of the allocated system memory and the processes executing transactions is commonly termed a database instance.

A session is a specific connection of a user to a database server via a user process. For example, when a user starts a database application, the user typically provides a valid username and password. The username and password are sent from the database application to the database server. The database server establishes a session for the user in response to receiving the username and password. The session lasts from the time the user connects to the database server until the time the user disconnects from the database server (or exits the database application).

Large business-critical applications are complex and experience highly varying load and usage patterns. These applications are expected to provide certain service guarantees in terms of response time, throughput, uptime, and availability. At times, it may be desirable to change a system that includes such applications. Such a change might involve upgrading the system's database or modifying a configuration, for example. However, before any change is made to a production system, extensive testing and validation should be performed in a test system. In order to be confident that a change will not cause problems (e.g., errors or performance issues) in the production system once that change is introduced into the production system, a system tester should try to expose the test system to a workload that is very similar to the workload that the production system would actually experience in a real world environment.

U.S. patent application Ser. No. 11/800,122 describes how a test database system (referred to herein as the "test system") may be subjected to the same workload to which a production database system (referred to herein as the "production system") would be subjected. To subject the test system to the same workload to which the production system would be subjected, a database server in the production system (a "production database server") captures and records workload that the production database server receives from external entities. This captured workload is then processed by the test relational database system, potentially in a non-real-time, out-of-line manner. One or more processes external to a database server in the test system (a "test database server") send the processed workload to the test database server. The test database server executes the workload. As a result, the test system is subjected to the same workload to which the production system was originally subjected.

It can be beneficial to replay, on the test system, the entire workload that was captured on the production system. However, under some circumstances, a user might want to replay only a portion of the captured workload on the test system.

A multitude of various environmental variables may be established during a session in the production system. These variables make up the session's state. A session's state may and often does change during the course of the session. A session's current state can and often does affect the results of the operations that are performed in that session. The operations that are performed in a session also can and often do affect the session's state. If an attempt were made to replay captured workload in a session that had a different session state than the session in which the workload was originally captured, then unexpected results could occur.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
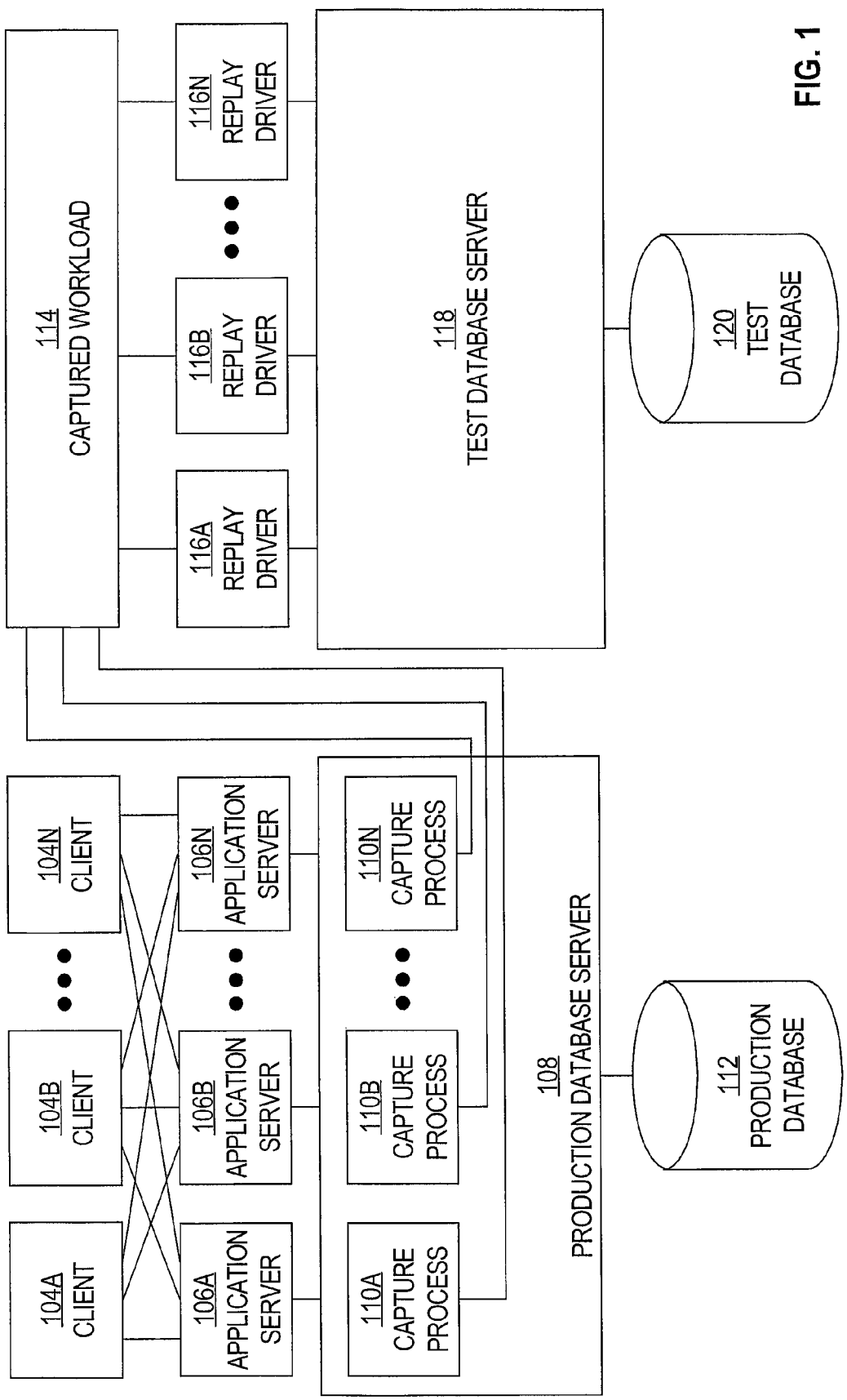
FIG. 1 is a block diagram that shows an example of a system in which workload that is submitted to a production database server is captured and replayed to a test database server, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are described herein for capturing and restoring database session state. According to one such technique, a user interface module presents, to a user, a user interface that specifies the identities of database sessions that currently exist on a production database server. Through the user interface, the user selects a set of the database sessions. In response to the user's command, components of the production database server save the session state of each of the database sessions in the user-selected set. These session states are persistently stored on a computer-readable storage medium. Thereafter, components of the production database server store, on the storage medium, workload units that are processed in the selected database sessions by the production database server.

Additionally, in response to the occurrence of specified events (e.g., reaching database transaction boundaries), within the selected database sessions, the components store, on the storage medium, updated session states of the database sessions in which those events occurred. Along with each stored database session state, the components store (a) the identity of the database session to which that session state belongs, and (b) an indication of the relative time at which the session state was captured. Thus, the components may capture multiple session states, pertaining to various different points in time, for each selected database session.

Sometime thereafter, the captured database session states, and the captured workload that was processed in the database sessions to which those states correspond, are moved from the production database server to a test database server. A user selects, from among the various points in time represented by the captured database session states, a particular point in time at which the user would like workload replay to begin. In response, database sessions are re-created on the test database server, and, using the captured session state information, the session states of these database sessions are set to reflect the session states as they existed at the user-selected point in time. The workload units that occur at or after the selected point in time are then replayed in the appropriate sessions relative to the test database server.

Thus, a user can replay, relative to a test database system, a selected portion of a set of captured database workload under the same session conditions that existed when that workload was originally processed relative to a production database system. The user does not need to replay all of the captured workload, but, instead, may specify that the replay of the workload is to begin at a certain point in the timeframe during which the workload was captured.

Various implementations of the techniques described are embodied in methods, apparatuses, and in computer-readable media.

Workload Capture and Replay System

FIG. 1 is a block diagram that shows an example of a system in which workload that is submitted to a production database server is captured and replayed to a test database server, according to an embodiment of the invention. The example shown includes clients 104A-N, application servers 106A-N, a production database server 108, a production database 112, captured workload 114, replay drivers 116A-N, test database server 118, and test database 120. Production database server 108 includes capture processes 110A-N.

Clients 104A-N may be separate computers or separate processes that execute on the same computer. For example, in one embodiment of the invention, clients 104A-N are Internet browsers (e.g., Mozilla Firefox) that execute on separate computers that are communicatively coupled to the Internet. In one embodiment of the invention, clients 104A-N send requests to, and receive responses from, application servers 106A-N over the Internet.

Application servers 106A-N may be separate computers or separate processes that execute on the same computer. For example, in one embodiment of the invention, application servers 106A-N are web server-invoked processes that execute on separate servers that are communicatively coupled to the Internet. In one embodiment of the invention, application servers 106A-N receive requests from, and send responses to, clients 104A-N over the Internet. Each of application servers 106A-N may implement different functionality for responding to different types of requests from clients 104A-N.

In servicing requests from clients 104A-N, application servers 106A-N might need to retrieve data from and/or store data to a database. To accomplish this, in one embodiment of the invention, application servers 106A-N establish database sessions with production database server 108. Within these sessions, application servers 106A-N send database commands to production database server 108. Such database commands may include Structured Query Language (SQL) select statements, for example.

Production database server 108 executes these database commands relative to production database 112. As a result of the executing these database commands, production database server 108 may store data in, and/or retrieve data from, production database 112. Production database server 108 may execute two or more database commands in a transactional manner, so that none of the effects of the database commands in a single transaction are made permanent in production database 112 unless all of the effects of those database commands can be made permanent. Production database server 108 may return, to application servers 106A-N, data retrieved from production database 112 as a result of the execution of certain database commands (e.g., SQL select statements). Applications servers 106A-N may use such retrieved data in forming responses to clients 104A-N.

In one embodiment of the invention, production database server 108 includes capture processes 110A-N. Capture processes 110A-N may be implemented as separate concurrently executing processes or as concurrently executing threads of the same process, for example. In one embodiment of the invention, capture processes 110A-N collectively, transparently, and non-intrusively capture all workload that production database server 108 receives from external entities (e.g., application servers 106A-N and/or clients 104A-N).

As used herein, the term "workload" refers to discrete, independently meaningful units called "workload units". In one embodiment of the invention, each "workload unit" corresponds to a separate "user request" (e.g., a request originating from (a) one of clients 104A-N, (b) one of application servers 106A-N, or (c) some other process that is external to production database server 108).

Capture processes 110A-N store and record this workload as captured workload 114. As a result, captured workload 114 may comprise workload that was captured during a specified interval of time, referred to herein as the "recording interval". In one embodiment of the invention, captured workload 114 represents actual real-world use of production database server 108, which use is not specifically for any testing purpose.

In one embodiment of the invention, capture processes 110A-N initially write captured workload to in-memory buffers. Data stored in these in-memory buffers is compressed and written out in batches to persistent storage. Because an I/O transaction involving persistent storage does not need to be performed after the capture of every individual workload unit, the impact of the workload capture on the performance of production database server 108 is reduced.

After capture processes 110A-N have stored workload in captured workload 114, captured workload 114 may undergo automated processing. This automated processing may be performed in a non-real-time manner. For example, after capture processes 110A-N have finished storing data in captured workload 114, processes external to production database server 108 may process captured workload 114. This processing may be performed while production database server 108 services further requests from application servers 106A-N. Thus, the processing of captured workload 114 may be performed without any interference with or impact on the operations of production database server 108.

In one embodiment of the invention, after captured workload 114 has undergone processing as discussed above, replay drivers 116A-N read the processed workload from captured workload 114 and send that processed workload to test database server 118. Replay drivers 116A-N may be implemented as separate concurrently executing processes or as concurrently executing threads of the same process, for example. In sending the processed workload to test database server 118, replay drivers 116A-N subject test database server 118 to the same workload to which clients 104A-N and/or application servers 106A-N subjected production database server 108 during the recording interval.

In one embodiment of the invention, replay drivers 116A-N synchronize the sending of workload units that they send to test database server 118 so that the differences in time between the test database server's receipt of those workload units corresponds to the differences in time between the production database server's previous receipt of those same workload units during the recording interval. Thus, in one embodiment of the invention, the duration of the interval of time during which replay drivers 116A-N send workload to test database server 118 is identical to the duration of the interval of time during which clients 104A-N and/or application servers 106A-N sent that same workload to production database server 108. In one embodiment of the invention, replay drivers 116A-N replay workload to test database server 118 in a manner that preserves all transactional dependencies that exist between transactions that are stored in captured workload 114.

In one embodiment of the invention, each of replay drivers 116A-N can replay workload that was captured by multiple separate capture processes 110A-N. Therefore, in one embodiment of the invention, there may be fewer replay drivers 116A-N than capture processes 110A-N. Each of replay drivers 116A-N may be multi-threaded.

Test database server 118 may be different in one or more respects from production database server 108. For example, test database server 118 might be an upgraded version of production database server 108. For another example, test database server 118 might be the same brand and version of production database server 108, but test database server 118 might be configured differently (e.g., in one or more settings) from production database server 108. For yet another example, test database server 118 might be an entirely different brand of database server from production database server 108. Test database server 118 might execute on a machine that has different hardware than the hardware of the machine on which production database server 108 executes. Test database server 118 might execute in conjunction with a different operating system than the operating system in conjunction with which production database server 108 executes. The purpose of subjecting test database server 118 to the same workload as that to which production database server 108 was actually subjected may be to determine whether the difference between test database server 118 and production database server 108, and/or the difference in the environments in which those database servers execute, is a permissible or desirable difference.

Test database server 118 processes the workload that test database server 118 receives from replay drivers 116A-N. If the workload comprises database commands, then test database server 118 executes the database commands relative to test database 120. As a result of the executing these database commands, test database server 118 may store data in, and/or retrieve data from, test database 120. Test database server 118 may execute two or more database commands in a transactional manner, so that none of the effects of the database commands in a single transaction are made permanent in test database 120 unless all of the effects of those database commands can be made permanent. Test database server 118 may return, to replay drivers 116A-N, data retrieved from test database 120 as a result of the execution of certain database commands (e.g., SQL select statements).

In the embodiment of the invention illustrated in FIG. 1, there is one instance of the production database server and one instance of the test database server. However, in alternative embodiments of the invention, there may be multiple production database server instances, all of which perform database operations relative to production database 112. Additionally, in alternative embodiments of the invention, there may be multiple test database server instances, all of which perform database operations relative to test database 120. In one embodiment of the invention, the number of production database server instances differs from the number of test database server instances.

Test database 120 may be different in one or more respects from production database 112. For example, the manner in which logical relational database structures are physically laid out and stored on disk in test database 120 might differ from the manner in such logical relational database structures are physically laid out and stored on disk in production database 112. Thus, although the values present in the data that is stored in production database 112 will be the same as the values present in the data that is stored in test database 120, the manner in which those values are stored on disk may differ between the two databases. Additionally, the manner in which relational tables are partitioned in test database server 120 may differ from the manner in which corresponding relational tables are partitioned in production database 112. Additionally, indices that are (or are not) constructed for relational tables in test database 120 may differ from indices that are (or are not) constructed for corresponding relational tables in production database 112. The purpose of subjecting test database server 118 to the same workload as that to which production database server 108 actually was subjected may be to determine whether the difference between test database 120 and production database 112 is a permissible or desirable difference. Typically, test database 120 is not merely a backup, mirror, or fail-over of production database 112.

The recording interval may begin at a time at which production database 112 is already in a certain state. For example, at the time that the recording interval begins, production database 112 might already contain one or more logical data structures (e.g., database tables, stored procedures, triggers, views, indices, etc.) which might already be populated with data. If test database 120 does not also contain these structures by the time that replay drivers 116A-N begin to "replay" captured workload 114 to test database server 118, then the execution of database commands within the replayed workload relative to test database 120 might produce errors. Therefore, in one embodiment of the invention, before replay drivers 116A-N begin to replay captured workload 114 to test database server 118, test database 120 is placed in the same logical state as production database 108. This may be accomplished by "backing up" production database 112 and performing a restore, from the resulting backup data, to test database 120, for example. In one embodiment of the invention, such a back up is performed at or shortly prior to the time that the original workload is going to be received at the production database 112. This essentially captures the pre-workload state of production database 112. Consequently, when the backup data is restored relative to test database 120, the state of test database 120 is highly similar to the state in which production database 112 existed prior to the receipt of the original workload.

The time interval during which replay drivers 116A-N replay captured workload 114 to test database server 118 may be completely non-overlapping and non-concurrent with the time interval during which capture processes 110A-N intercept and store that workload. For example, capture processes 110A-N might intercept and record captured workload 114 during a first time interval. Hours, days, or even weeks after the end of that first time interval, replay drivers 116A-N might replay captured workload 114 to test database server 118 during a second time interval that is not concurrent with any part of the first time interval.

Beneficially, in one embodiment of the invention, clients 104A-N and application servers 106A-N are not needed to replay captured workload 114 to test database server 118. Because replay drivers 116A-N handle the replaying of captured workload 114 to test database server 118, there is no need to duplicate clients 104A-N or application server 106A-N in the replay system. This advantageously saves resources.

Fast Forwarding and Beginning Replay at a Specified Point

Sometimes, a system operator will want to replay all of captured workload 114 relative to test database server 118. However, at other times, the system operator might want to replay only a specified portion of captured workload 114 relative to test database server 118. At such times, the system operator might want to "fast forward" to a certain point of time in captured workload 114 and replay a portion of captured workload 114 relative to test database server 118 only from that point onward. For example, the system operator might only be interested in replaying a "peak hour" of activity represented within captured workload 114; this portion of captured workload 114 might represent the workload that was captured during the hour that production database server 108 was the most busy, and/or the hour that production database server 108 received the largest quantity of requests from applications servers 106A-N. Under such circumstances, the system operator might want to "fast forward" to the beginning of the portion of captured workload 114 that represents the beginning of the "peak hour" and replay only that portion that corresponds to the "peak hour." Therefore, in one embodiment of the invention, the replay system includes temporal position selection mechanisms that allow a specified preceding part of captured workload 114 to be skipped during replay so that replay can begin after this preceding part.

Maintaining Transactional Consistency in Session States of Multiple Sessions

In one embodiment of the invention, when multiple sessions are captured by one capture operation, the system disclosed herein guarantees transactional consistency of the session state across the captured sessions. That is, all the sessions are captured at the same transaction boundary. The snapshot of these sessions is taken as of the same system change number ("SCN") of the database. This capability allows the clients of the database system to have consistent reference to the session states, on which they can rely to perform further operations in the session when using the captured session state. For example, workload replay can chapter the recorded workload based on the SCN and align the workload with session state to support the fast-forward functionality.

According to one embodiment of the invention, the transactional consistency is achieved by: (a) multiple sessions synchronized at transaction boundary during capture and restore; and (b) no change to the database state during the capture and restore process. In one embodiment of the invention, the steps to ensure the transactional consistency include the following: (1) A coordinator session marks a session with suspend option. (2) User sessions are suspended once they reach the capture boundary of a transaction and the current call boundary, and when capture criteria are met. (3) After all the selected sessions reach the capture boundary and are suspended (and only then), then the coordinator session initiates capture of all the suspended sessions. Hence, the captured session states are aligned to the database SCN at this point. (4) The session is still suspended after it captures its own session state, until all the sessions are done with capture and the coordinator resumes the workload. This is necessary to avoid the situation where some sessions are resumed and changing database state while other sessions are still working on capture. (5) In the restore phase, similarly, multiple sessions are restored after all of them are stabilized. (6) The restored session is suspended after the restore process, until all the sessions are done with restore. The reason for this is similar to the reason for suspension discussed in point (4) above.

Throughout the capture and restore process, there is no change to the database state. The session states are serialized to external storage. No change needs to be committed in the database during the capture and restore process.

Duplicating Database Session State for Replay

In at least one implementation of the system shown in FIG. 1, in order for the system operator to be able to replay the workload that occurs within the desired portion of captured workload 114, there needs to exist some way of ensuring that the session state of each database session existing in test database server 118 will be the same as a corresponding session state that existed at the time that the desired portion was originally captured. If the session states are not the same, then the results of replaying the specified workload portion relative to test database server 118 will be influenced by the difference in session state, leading to unpredictable results during replay. For example, if the portion of captured workload 114 that the system operator wants to replay begins at 1 hour after the recording interval began (the "period starting time"), and if a particular database session in which the workload was originally processed was in a particular state at the period starting time, then, in at least one implementation of the system, a corresponding database session needs to be established in test database server 118, and the state of that corresponding database session needs to be set to be identical to the particular state before the portion of captured workload 114 is replayed relative in that corresponding database session. Workload units sometimes depend on the current session state of the database session in which those units execute to produce their results, and so it is desirable for database session state to be duplicated from the original capture session to the corresponding replay session.

Therefore, in one embodiment of the invention, captured workload 114 includes database session state information that is captured along with the workload that is processed during the recording interval. For example, capture processes 110A-N capture this database session state information in one embodiment of the invention.

Characteristics of Database Session State

As used herein, a "database session" is a database environment in which workload units are processed by a database server. Such workload units may include, for example, SQL and PL/SQL statements. Each database session has a set of session variables that are specific to that database session; multiple concurrently existing database sessions may have different session variables with different values, and therefore, with different session states. For example, PL/SQL package variables may be among the variables that are maintained within the database session state. PL/SQL commands may refer to these session variables, and use and/or modify the values thereof, during the lifetime of the database session. The scope of such variables is limited to the database session. Session variables may also include database session parameters that a database administrator has specified in order to cause the database system to operate in a certain manner. Database session parameters may include, for example, a date format, variables that indicate whether parallelism is enabled or disabled, and system-wide parameters that may apply to multiple concurrently existing sessions. Although certain examples have been given of types of information that may be maintained as part of database session state, such examples should not be considered to be an exhaustive list of types of information that may be maintained as part of database session state. Additionally, not all database session state necessarily will maintain all of the types of information that have been discussed in the foregoing examples.

Some other examples of information that may be maintained and preserved within database session state include temporary database tables, temporary large objects (LOBs), database management system (DBMS) packages, etc.

In one embodiment of the invention, database session state is essentially a set of populated data structures that contain values for one or more of the variables discussed herein. Although database session state might be conceptualized as a "memory dump" of the memory of the machine on which production database server 108 executes, in one embodiment of the invention, database session state is captured at a logical, rather than a physical, level, so that differences between the hardware platforms on which production database server 108 and test database server 118 execute do not influence the database session state. For example, the exact memory addresses at which variable's values are stored do not necessarily need to be captured in the database session state information, although the name and value of each such variable typically are captured. Thus, in one embodiment of the invention, in order to duplicate database session state on test database server 118, all of the database session state variables and the values thereof that were captured (during the recording interval) in the memory of the machine on which production database server 108 executes are replicated and stored in the memory of the machine on which test database server 118 executes, though not necessarily at exactly the same memory addresses.

Typically, during the recording interval, a database session begins when one of application servers 106A-N requests that production database server 108 open a new session in which that application server will have production database server 108 process workload. Usually, application servers 106A-N make such requests in response to corresponding requests from clients 104A-N. Each such request typically originates from a client user who is beginning a transaction for himself. A database session therefore usually begins when such a user's transaction starts, and usually ends when that user's transaction is finished (a user's transaction should not be confused with a database transaction; multiple separate transactions may be involved in a particular user's transaction). For example, a user's transaction might begin when the user logs in to a web-enabled bank application (executed on one of application servers 106A-N), and might end when the user logs off of the web-enabled bank application. During the user's transaction, the user might instruct the bank application to transfer funds between various accounts. Under such circumstances, all of these funds transfers would be performed in the context of the same database session state. Variables pertaining to the amounts of funds transferred might be stored within session variables that are a part of the database session state. Thus, in many scenarios, a database session corresponds to a user's transaction, and begins and ends with the beginning and ending of that user's transaction.

User Interface for Database Session Capture

In one embodiment of the invention, a user interface module executes on a computer system—either the same computer system on which production database server 108 executes, or a different computer that is communicatively coupled (e.g., via a network) to the computer system on which production database server 108 executes. The user interface module presents, to a user, a user interface through which the user can specify parameters related to the workload capture. In one embodiment, in response to the user's instruction through this user interface, capture processes 110A-N begin to capture workload and database session state information and store that workload and information in captured workload 114. Captured workload 114 may be stored as one or more files on one or more hard disk drives, for example. Capture processes 110A-N may stream the captured workload and database session state information into these files as the workload and session state information becomes available in the production system. Database session state information for multiple different concurrently existing sessions may be captured and stored in this manner. Thus, in one embodiment of the invention, the workload that was processed in one session is stored distinctly (e.g., in a separate file) from the workload that was processed in another session.

In one embodiment of the invention, after the recording interval has ended, the files that comprise captured workload 114 are moved from the production system to the test system. Database sessions, represented by the database session state information within captured workload 114, are re-constructed relative to test database server 118. Once the database sessions have been reconstructed, then the workload units that correspond to those database sessions are replayed in the appropriate ones of those database sessions. Some example techniques for replaying workload relative to test database server 118 are disclosed in U.S. patent application Ser. No. 11/800,224.

In one embodiment of the invention, database session state is captured at each transaction boundary (i.e., at the beginning and the end of each transaction), or, under circumstances in which there are no transactions, at each call boundary. As used herein, a "call" is the execution of a SQL or PL/SQL statement. Thus, in one embodiment of the invention, in the absence of transactions, database session state is captured after each SQL or PL/SQL statement (or some other workload unit) is executed. Inasmuch as a database transaction typically concludes when that database transaction commits, making the database transaction's changes persistent in the database, a database transaction boundary typically occurs when a database transaction commits.

In one embodiment of the invention, for each database session that currently exists on production database server 108, the user interface displays an identity of that session along with useful information about that session. The user interface provides a selection mechanism through which the user can select one or more of the existing database sessions to be captured. In response to the user's selection of a particular database session, capture processes 110A-N initiate the capture of the workload and database session state for the particular database session, typically beginning at the next transaction boundary (in systems in which transactions exist).

Capturing Multiple Concurrent Sessions

As is discussed above, in one embodiment of the invention, a module that presents a user interface is provided, and this user interface provides a selection mechanism through which a user can select multiple concurrent database sessions to be captured. In one embodiment of the invention, in order to capture a consistent view of the states of multiple database sessions, as soon as the user indicates that the capture is to begin, production database server 108 begins to suspend each of the selected database sessions as it becomes safe to suspend each of those sessions. In one embodiment of the invention, a particular database session is only suspended at the next transaction boundary in that session, in the case of transactional database systems, or at the next call boundary in that session, in the case of transaction-less database systems. Therefore, one selected database session might become suspended before another selected database session becomes suspended, in the event that one selected database session reaches a transaction boundary before another selected database session does.

While a particular database session is suspended, production database server 108 ceases processing workload units for that particular database session. In one embodiment of the invention, only after all of the selected database sessions have become suspended do capture processes 110A-N begin to capture database session state and workload for those selected database sessions. Thus, in one embodiment of the invention, as soon as all of the user-selected database sessions have become suspended, the user interface module instructs production database server 108 to resume (i.e., unsuspend) all of the selected database sessions, at which time production database server 108 continues to process workload units for each of the then resumed selected database sessions. At this time, capture processes 110A-N proceed to capture workload units and database session state pertaining to the user-selected database sessions. During the performance of the technique described above, production database server 108 may continued to process workload units belonging to other existing database sessions that have not been selected for capture by the user.

Some user-selected database sessions might take a long time, after the user's command to capture a set of selected database sessions, to reach a transaction boundary at which those sessions can be suspended safely. Therefore, in one embodiment of the invention, the user interface module displays, with each existing database session, a real-time status indicator that indicates whether that database session is currently suspended or not. In one embodiment of the invention, the user interface module provides a "boot out" mechanism through which the user can remove one or more database sessions of the user's choice from the previously selected set of database sessions to be captured. Thus, if one of the database sessions continues for a significant period of time after all of the other database sessions in the user-selected "to be captured" database session set have become suspended, then the user can selectively remove the not-yet-suspended database session from the "to be captured" set so that the capture of the other sessions in the set can commence.

Suspend Before Capture Approach

In an embodiment of the invention described above, capture processes 110A-N begin to capture database session state and workload units for user-selected database sessions as soon as all of the user-selected database sessions have become suspended. In such an embodiment of the invention, production database server 108 unsuspends and resumes each of the suspended user-selected database sessions. However, in an alternative embodiment of the invention, production database server 108 does not immediately unsuspend these suspended database sessions as soon as all of the user-selected database sessions have become suspended. Instead, in such an alternative embodiment of the invention, the suspended database sessions remain suspended until the user interface module receives an instruction, from the user, that capture is to begin. In response to the user's instruction that the capture is to begin, production database server 108 unsuspends the suspended user-selected database sessions, and capture processes 110A-N begin to capture workload units and database session state for those database sessions.

Capture Before Suspend Approach

In an embodiment of the invention described above, the capture of all of the user-selected database session states commences at approximately the same time—after each of the user-selected database session states has suspended. However, in an alternative embodiment of the invention, the database session state of each of the user-selected database sessions is captured immediately before that session becomes suspended. Thus, in such an alternative embodiment of the invention, when a transaction boundary (in transaction-based database systems) is reached in a particular selected database session, the session state of that database session is immediately captured, and then that database session is immediately suspended. In such an alternative embodiment of the invention, other ones of the user-selected database sessions may continue to process workload until they also reach a transaction boundary, at which time they also will have their session states captured and at which time they also will be suspended. Thus, in such an alternative embodiment of the invention, the database session states of different selected database sessions may be captured at different times. In such an alternative embodiment of the invention, after all of the user-selected database sessions have become suspended in this manner, then either (a) production database server 108 automatically unsuspends and resumes all of the suspended user-selected database sessions, or (b) production database server 108 waits until a certain user instruction is received through the user interface discussed above, in response to which production database server unsuspends and resumes all of the suspended user-selected database sessions. Some embodiments of the invention may use the automatic unsuspend-and-resume technique, while other embodiments of the invention may use the user-directed unsuspend-and-resume technique.

In one embodiment of the invention, if a particular user-selected database session state is idle at the time that session state is to be captured, then production database server 108 "wakes up" the idle session, performs a capture of the awakened session, and then permits the session to become idle again.

Differences from Transparent Session Migration

Some Oracle database systems provide a feature called "transparent session migration," or "TSM." Using TSM, if one instance of a production database server is becoming overloaded with work, then that instance can capture a database session and transparently migrate that database session (e.g., over a network) to another concurrently executing production database server instance, which can then resume the migrated database session's work. This reduces the workload on the original production database server's instance. However, unlike TSM, at least one embodiment of the invention involves storing the captured database session state on a persistent storage medium such as a hard drive. As is discussed above, in one embodiment of the invention, the captured database session state is stored persistently in a file. Such a file can be stored for a long period of time, after the completion of the recording interval, and replayed multiple times on multiple future occasions. Such a file can be replayed relative to a separate test database system that is not a part of the production database system. In contrast, TSM involves transferring database session state directly from the memory of one database server instance into the memory of another concurrently executing database server instance.

Thus, according to an embodiment of the invention, multiple (rather than just one) session states for a particular session are captured during the recording interval at different times (e.g., at transaction or call boundaries), and any one of these multiple database session states can be used to replay captured workload 114 from any one of those states-even without replaying any of the workload that was captured earlier than those states. The original database session continues on production database server 108 during the recording interval even after each session state has been captured. This differs from TSM, in which only one session state (the state at the time that migration is conducted) is captured, and in which that session immediately ends on the instance from which the session was migrated and immediately resumes on the instance to which the session was migrated, only once, and without significant intervening periods of time. In TSM, no database session state is persistently stored on a persistent storage medium, and only one database session state is captured for a particular session that is going to be transparently migrated.

Furthermore, because TSM involves transparently migrating a session, no user is involved in selecting when the session will be migrated. Under TSM, users typically remain unaware that any session has been transferred. TSM does not permit a user to replay a database session at a time of the user's choosing or relative to a database server of the user's choosing. In contrast, in at least one embodiment of the invention, a user actively instructs (e.g., through the user interface discussed above) production database server 108 to begin capturing a database session, and that user can choose on which other database server that database session will be replayed, how many times that database session will be replayed, and the times at which those database sessions will be replayed.

TSM cannot be used to capture a database session, and then, at a much later time, after the entire database session has concluded on the production database system, replay that database session relative to a separate test database system. TSM cannot be used to replay a captured database session multiple times. TSM can only resume a captured database session from the moment at which the database session was migrated, and not beginning at any moment chosen by a user. Various embodiments of the invention can be used to accomplish each of these operations that TSM is not capable of accomplishing.

Example Flow

Figure 2A:
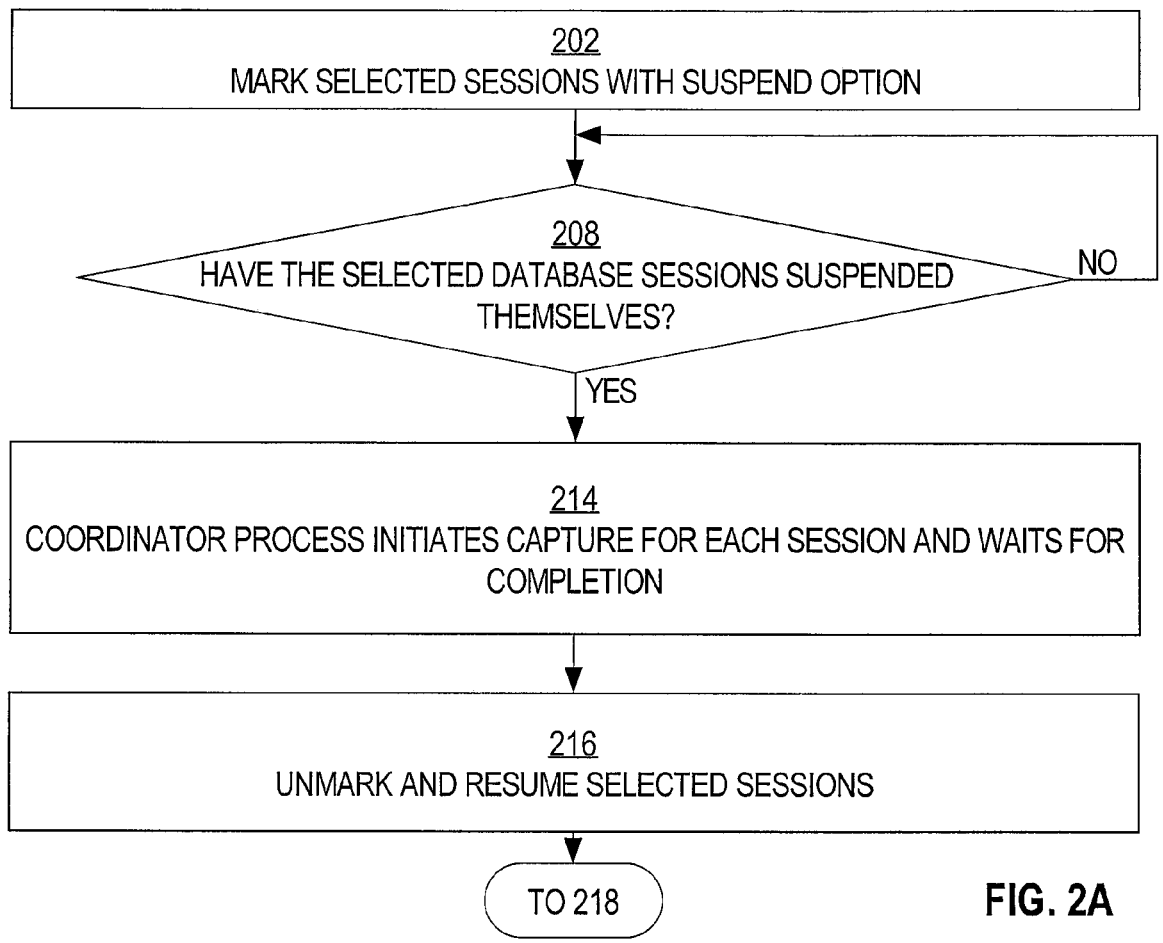
FIGS. 2A and 2B are flowcharts illustrating an example technique for capturing and restoring database session state, according to an embodiment of the invention.
Figure 2B:
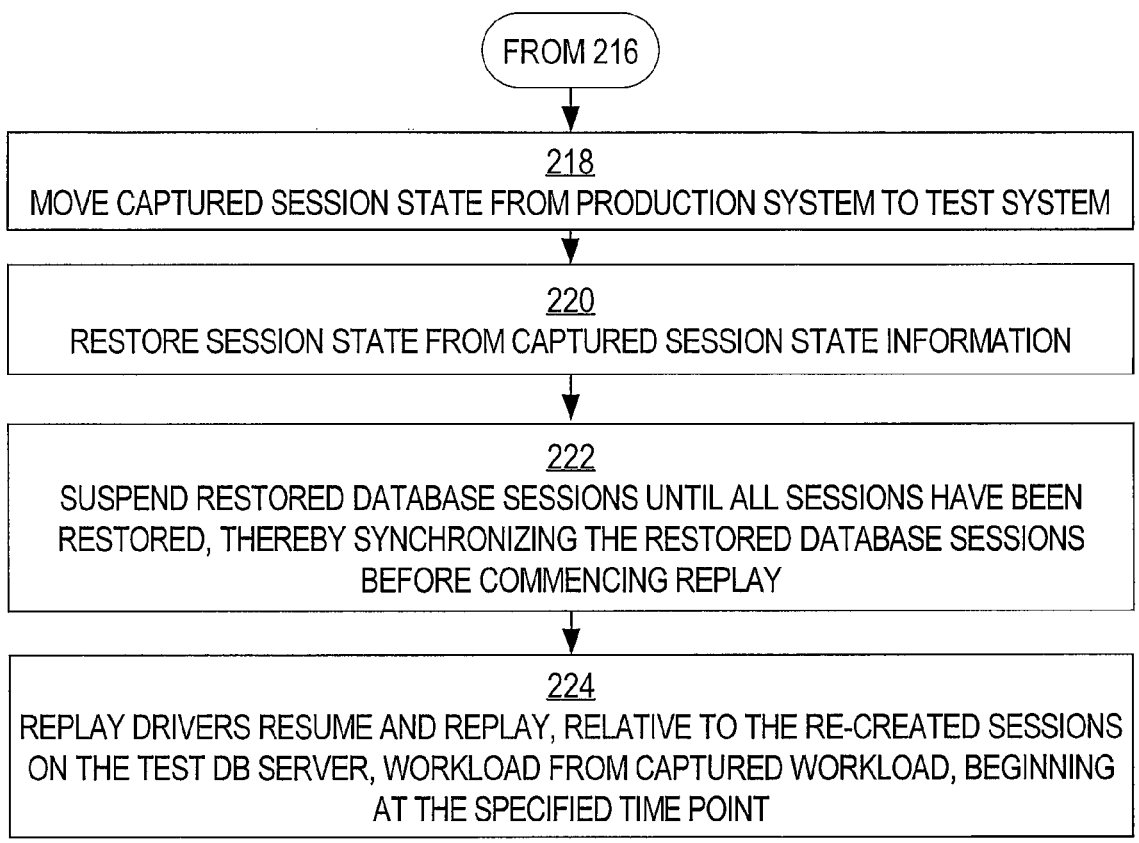

FIGS. 2A and 2B are flowcharts illustrating an example technique for capturing and restoring database session state, according to an embodiment of the invention. Alternative embodiments of the invention may comprise additional, fewer, or different steps than those described below. For example, although the technique discussed below involves the "suspend and then capture" approach, alternative embodiments of the invention may involve the "capture and then suspend" approach, discussed above, instead. Furthermore, although the technique discussed below involves the determination of when a transaction boundary has been reaches, alternative embodiments of the invention may involve, instead, a determination of when a call boundary has been reached.

In one embodiment of the invention, during the "capture" phase, workload is being captured prior to session state capture, and then session state is captured during the workload capture (workload capture may continue after session state capture). Conversely, during the "replay" phase, captured session state is restored prior to workload replay, and only after captured session state has been restored, then captured workload is replayed.

Referring first to FIG. 2A, in block 202, one or more selected sessions are marked with a "suspend" option. For example, a user interface module (also called a "coordinator") might present a user interface to a user. The user may be a database administrator, for example. The user interface may indicate the identities of multiple database sessions that currently exist on production database server 108. The user interface module may receive, from the user, user input that indicates the user's selection of a set of selected database sessions. The user interface module responsively indicates, to the user (e.g., via highlighting), which of the database sessions have been selected by the user. The user interface module receives, from the user, user input that indicates that the capture of the selected database sessions should commence. In response to receiving the user input, the coordinator instructs the selected sessions to suspend themselves at the next transaction boundaries that occur in the selected sessions. The selected sessions may continue processing workload after those sessions have been marked. When any selected session reaches a transaction boundary, that selected session suspends itself.

In block 208, the coordinator determines whether each of the selected sessions has suspended itself. In one embodiment of the invention, the coordinator determines whether a selected database session has suspended itself by querying the database. If each of the selected database sessions has suspended itself, then control passes to block 214. Otherwise, control passes back to block 208.

In block 214, in response to a determination that all of the selected database sessions are currently suspended, the coordinator initiates the session capture by issuing a capture command to each of the suspended selected database sessions. In response to the coordinator's instruction, each of the suspended selected database sessions unsuspend themselves and capture their session states. Capture modules 110A-N capture the database session states of each of the selected database sessions. Capture modules 110A-N persistently store (e.g., in files on a hard disk drive) each of the database session states. For example, capture modules 110A-N may store the database session states in the same files in which captured workload 114 will be stored. The coordinator process waits for completion.

In block 216, after the session states of all of the suspended selected database systems have been captured, each of the suspended selected database sessions is unmarked and resumes processing workload. Capture modules 110A-N commence capturing the workload that is processed in each of these resumed sessions. Capture modules 110A-N persistently store the captured workload in captured workload 114. As is discussed above, in one embodiment of the invention, thereafter, whenever a transaction boundary is reached in any of the selected database sessions, capture modules 110A-N capture and store, in captured workload 114, the session state of the database session in which the transaction boundary was reached. In one embodiment of the invention, a relative logical time indicator, called the system change number (SCN), is stored in connection with each captured workload unit and each captured database session state. The SCN indicates when the corresponding workload unit and database session state occurred relative to other captured workload units and other captured database session states. For example, database session states that are associated with higher SCNs occur later in time than database session states that are associated with lower SCNs. Control passes to block 218 of FIG. 2B.

Referring next to FIG. 2B, in block 218, which, in one embodiment of the invention, may occur after all of the selected database sessions have completed, captured session state (which may be contained in captured workload 114) is moved from the production system to the test system. For example, a database administrator may move the files that contain the captured session state from the production system to the test system.

In block 220, in response to a user's command to replay selected database sessions in the captured workload from a user-specified point in time (which, in one embodiment of the invention, is specified via a system change number (SCN) that is preserved with each workload unit and captured session state in captured workload 114), database state is restored from captured session state information. In one embodiment of the invention, the database session states of the selected database sessions are loaded from captured workload 114. Based on the information contained in these database session states, corresponding database sessions are restored and re-created in test database server 118. For example, in one embodiment of the invention, replay drivers 116A-N restore and re-create the corresponding database sessions in test database server 118. As is discussed above, in one embodiment of the invention, restoring the database sessions involves loading, into the memory of the machine on which test database server 118 executes, variables and the values thereof that were preserved in the database session state that was stored in captured workload 114.

In one embodiment of the invention, the database session states that are re-created in test database server 118 are those that correspond to the point in time specified by the user in block 220. As a result, workload replay can commence relative to test database server 118 starting at this point in time, rather than some earlier time. This can eliminate wasted time when the user does not care about replaying workload that occurred prior to the selected point in time.

In one embodiment of the invention, when there are multiple database session states to be restored, the restored database session states are suspended as they are restored. Thus, all of the database session states remain in a suspended state until all of the database sessions have been restored. As a result, all of the restored database sessions become synchronized with each other. This is shown in block 222. In such an embodiment of the invention, the restored database sessions are unsuspended after all of the database sessions have been restored and had their session states set to reflect the point in time specified by the user in block 220.

In block 224, with the database sessions recreated in test database server 118, and with those database sessions having the session states that correspond to the point in time selected by the user in block 220, replay drivers 116A-N replay, relative to test database server 118, the captured workload units that are stored in captured workload 114. In one embodiment of the invention, this is accomplished by instructing each of the suspended restored sessions to unsuspend and resume.

In one embodiment of the invention, only those workload units that are associated with SCNs that are at least as great as the SCN that the user designated to specify the selected starting point in time are replayed. In one embodiment of the invention, captured workload 114 indicates, for each of the workload units to be replayed, an identity of the database session in which those workload units were originally captured. This database session identity allows replay drivers 116A-N to replay, relative to test database server 118, workload units in the same database sessions in which those workload units were originally processed in production database server 108. Thus, if a first workload unit was originally processed in database session "A" and if a second workload unit was originally processed in database session "B" during the recording interval, then the first workload unit will be replayed in database session "A" (having all of the database session state that database session "A" had when the first workload unit was originally processed) and the second workload unit will be replayed in database session "B" (having all of the database session state that database session "B" had when the second workload unit was originally processed) during the replay interval.

Example Event Sequence

Figure 3:
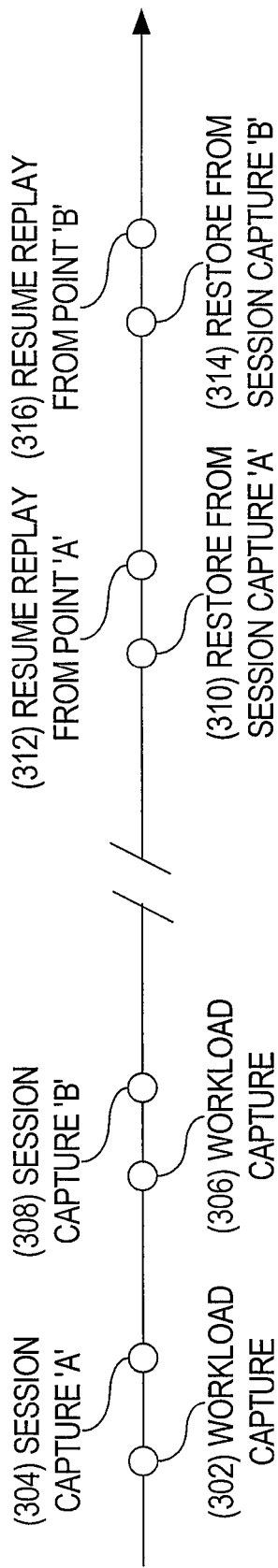
FIG. 3 is a diagram that shows an example sequence of events that may occur during session capture and session replay, according to an embodiment of the invention.

FIG. 3 is a diagram that shows an example sequence of events that may occur during session capture and session replay, according to an embodiment of the invention. Events 302-316 correspond to events that occur in sequence in time. In event 302, database workload is captured. In event 304, one or more database session states are captured at a point 'A' in time. After event 304, database workload processing resumes. In event 306, database workload continues to be captured. In event 308, one or more database session states are captured at a point 'B' in time. The session states captured at point 'B' in time may differ from the session states captured at point 'A' in time. Collectively, events 302-308 are capture-related events. According to one embodiment of the invention, the workload capture discussed above is already in progress prior to event 302, and continues even beyond event 308.

In contrast, events 310-316 are replay-related events. In event 310, database sessions are restored to the session states that existed at point 'A' in time from the information captured during event 304. In event 312, captured workload is replayed in the restored sessions beginning at point 'A' in time and continuing thereon. In event 314, in response to a user's decision to "fast forward" to another point in time (specifically, point 'B'), and commence database workload replay from that point in time, database sessions are restored to the session states that existed at point 'B' in time from the information captured during event 308. In event 316, captured workload is replayed in the restored sessions beginning at point 'B' in time and continuing thereon. As is discussed above, sessions may be restored to a different database than the database on which the session states of those sessions were captured, and database workload may be replayed in a different database than the database in which that workload was originally captured.

Hardware Overview

Figure 4:
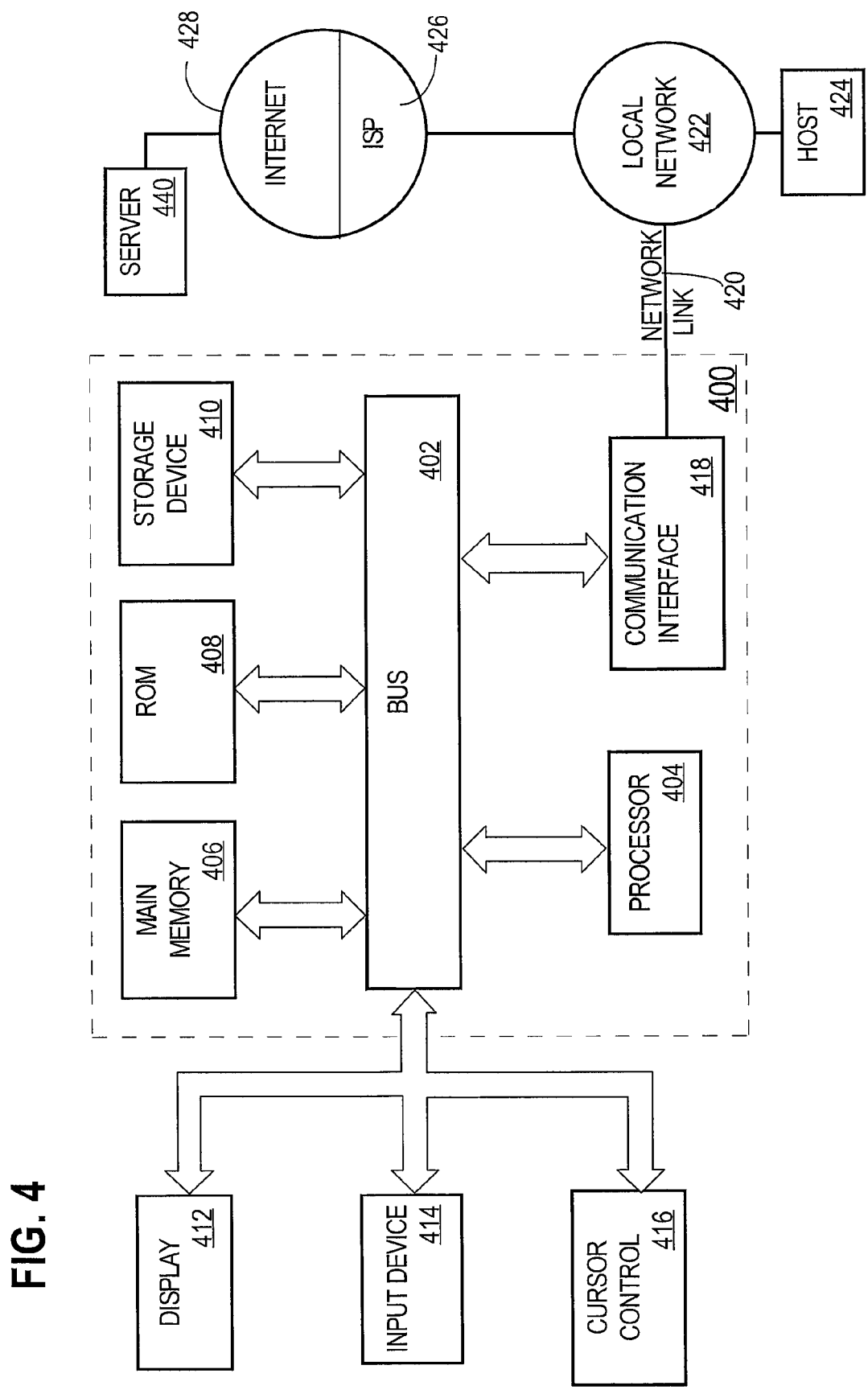
FIG. 4 is a block diagram of a computer system upon which embodiments of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The terms "machine-readable medium" and "computer-readable medium" as used herein refer to any medium that participates in providing data that causes a machine or computer, respectively, to operate in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. The terms "machine-readable storage medium" and "computer-readable storage medium" refer to volatile and non-volatile media upon which data can be stored. Transmission media includes coaxial cables, copper wire and fiber optics, including the wires that comprise bus 402. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use a transmitter to convert the data to a signal. A detector can receive the data carried in the signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
capturing a session state of a database session in a first database server as the database session exists at a point in time after a specified time point;
recreating, based on the session state, the database session in a second database server that is separate from the first database server;
receiving, from a user, a selection of two or more database sessions in the first database server;
for each particular database session of the two or more database sessions, suspending said each particular database session; and
after all of the two or more database sessions are suspended, capturing and storing a separate database session state for each particular database session of the two or more database sessions.

2. A computer-implemented method comprising:
capturing a session state of a database session in a first database server as the database session exists at a point in time after a specified time point;
recreating, based on the session state, the database session in a second database server that is separate from the first database server;
receiving, from a user, a selection of two or more database sessions that exist in the first database server;
for each particular database session of the two or more database sessions:
capturing and storing a session state of said each particular database session,
after capturing and storing the session state of said each particular database session, suspending said each particular database session, and
after all of the two or more database sessions are suspended, resuming each particular database session of the two or more database sessions.

3. A computer-implemented method comprising:
capturing a session state of a database session in a first database server as the database session exists at a point in time after a specified time point; and
recreating, based on the session state, the database session in a second database server that is separate from the first database server;
wherein capturing the session state of the database session in a first database server at the database session exists at the point in time after the specified time point comprises storing, on a non-volatile computer-readable storage medium, one or more variables that are contained in volatile memory of a first computer on which the first database server executes, along with one or more values of those one or more variables;
wherein recreating, based on the session state, the database session in the second database server comprises loading, from the non-volatile computer-readable storage medium, and into a volatile memory of a second computer on which the second database server executes, the one or more variables along with the one or more values of those one or more variables;
wherein the first computer is separate from the second computer; and
wherein the first database server does not execute concurrently with the second database server.

4. A volatile or non-volatile computer-readable storage medium storing instructions, the instructions including instructions which, when executed by one or more processors, cause the one or more processors to perform the steps of comprising:
capturing a session state of a database session in a first database server as the database session exists at a point in time after a specified time point;
recreating, based on the session state, the database session in a second database server that is separate from the first database server;
receiving, from a user, a selection of two or more database sessions that exist in the first database server;
for each particular database session of the two or more database sessions:
capturing and storing the session state of said each particular database session,
after capturing and storing the session state of said each particular database session, suspending the particular database session, and
after all of the two or more database sessions are suspended, resuming each particular database session of the two or more database sessions.

5. A volatile or non-volatile computer-readable storage medium storing instructions, the instructions including instructions which, when executed by one or more processors, cause the one or more processors to perform the steps comprising:
capturing a session state of a database session in a first database server as the database session exists at a point in time after a specified time point;

recreating, based on the session state, the database session in a second database server that is separate from the first database server;

receiving, from a user, a selection of two or more database sessions that exist in the first database server;

for each particular database session of the two or more database sessions:

capturing and storing a session state of said each particular database session, after capturing and storing the session state of said each particular database session, suspending said each particular database session, and after all of the two or more database sessions are suspended, resuming each particular database session of the two or more database sessions.

6. A volatile or non-volatile computer-readable storage medium storing instructions, the instructions including instructions which, when executed by one or more processors, cause the one or more processors to perform the steps comprising:

capturing a session state of a database session in a first database server as the database session exists at a point in time after a specified time point; and recreating, based on the session state, the database session in a second database server that is separate from the first database server;

wherein capturing the session state of the database session in a first database server as the database session exists at the point in time after the specified time point comprises storing, on a non-volatile computer-readable storage medium, one or more variables that are contained in volatile memory of a first computer on which the first database server executes, along with one or more values of those one or more variables;

wherein recreating, based on the session state, the database session in the second database server comprises loading, from the non-volatile computer-readable storage medium, and into a volatile memory of a second computer on which the second database server executes, the one or more variables along with the one or more values of those one or more variables;

wherein the first computer is separate from the second computer; and wherein the first database server does not execute concurrently with the second database server.

* * * * *

UNITED STATES PATENT AND TRADEMARK OFFICE
CERTIFICATE OF CORRECTION

| | | |
|---|---|---|
| PATENT NO. | : 8,433,680 B2 | Page 1 of 1 |
| APPLICATION NO. | : 12/166272 | |
| DATED | : April 30, 2013 | |
| INVENTOR(S) | : Ling et al. | |

It is certified that error appears in the above-identified patent and that said Letters Patent is hereby corrected as shown below:

In the Specifications:

In column 7, line 29, delete "back up" and insert -- backup --, therefor.

In the Claims:

In column 20, line 19, in Claim 3, delete "at the" and insert -- as the --, therefor.

Signed and Sealed this
Twenty-seventh Day of August, 2013

Teresa Stanek Rea
*Acting Director of the United States Patent and Trademark Office*